United States Patent [19]

Sparks et al.

[11] 3,820,583
[45] June 28, 1974

[54] APPARATUS FOR AND METHOD OF MAKING A MULTIPLE LAYER SHEET

[75] Inventors: James I. Sparks; Paul L. Spivy, both of Springfield, Mo.

[73] Assignee: Dayco Corporation, Dayton, Ohio

[22] Filed: Jan. 18, 1973

[21] Appl. No.: 324,693

[52] U.S. Cl.............. 156/190, 156/269, 156/510, 156/446, 156/584
[51] Int. Cl............................................ B65h 54/00
[58] Field of Search .......... 156/263, 168, 264, 176, 156/184, 227, 204, 166, 199, 462, 446, 474, 156/190, 584, 510; 270/79

[56] References Cited
UNITED STATES PATENTS
2,619,444  11/1952  Grantham........................... 156/204
3,166,456  1/1965  White et al. ....................... 156/204

Primary Examiner—Charles E. Van Horn
Assistant Examiner—J. Massie

[57] ABSTRACT

An apparatus for and method of making a multiple layer sheet in a substantially continuous manner are provided each of which employs a permanent reusable substrate which is movable in opposed directions and which enables a supply web of material used to define such sheet to be laminated to define any desired number of layers by urging a first length of the web into adhering contact against the substrate while moving the substrate in one direction followed by bi-folding the web to start a second length and urging the second length of the web into adhering contact against the first length to define the multiple layer sheet while moving the substrate in a direction opposite from the one direction.

11 Claims, 6 Drawing Figures

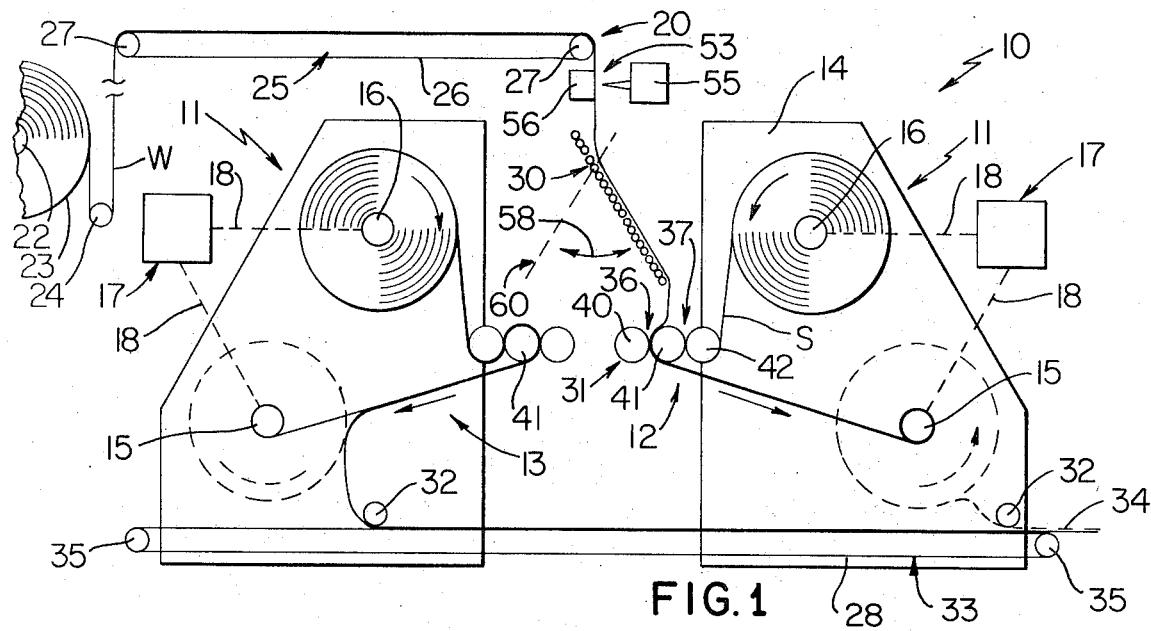
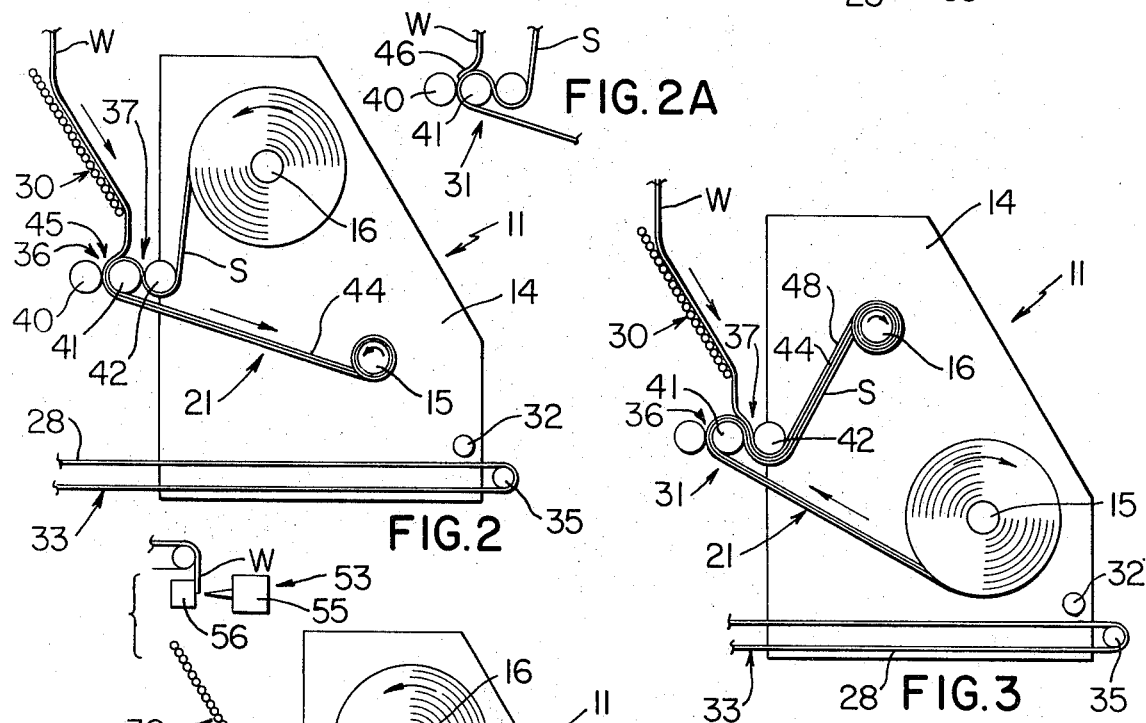
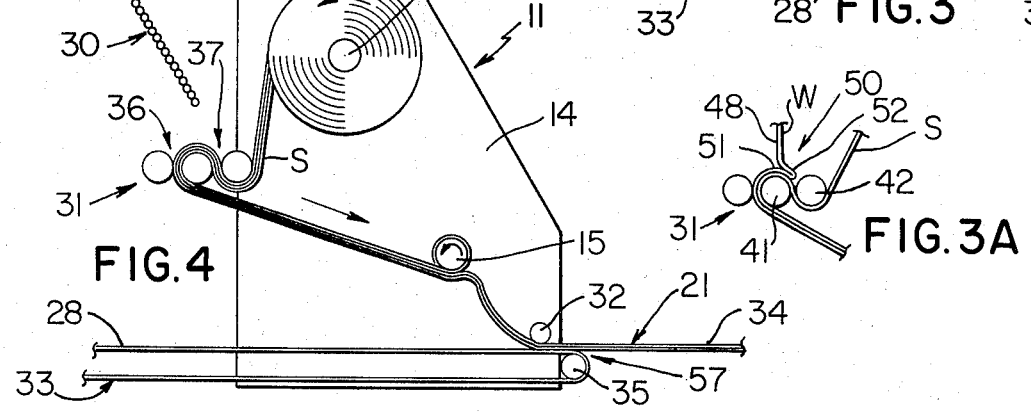

APPARATUS FOR AND METHOD OF MAKING A MULTIPLE LAYER SHEET

BACKGROUND OF THE INVENTION

In the manufacture of endless power transmission belts, pneumatic tires, fluid-conveying hose or tubing, and similar products, it is often necessary to employ an elastomeric material such as a web or uncured rubber, for example, which is laminated or piled up to define a multiple layer sheet. The multiple layer sheet is then subsequently used to manufacture the final product.

However, it is very difficult, in making such a multiple layer sheet, to provide such sheet in a continuous high volume operation which is compatible with mass production techniques and thereby keep the cost of such a sheet at a minimum.

SUMMARY

This invention provides an apparatus for and method of making a multiple layer sheet of the character mentioned in a single, continuous, high volume, operation yet at minimum cost.

The apparatus and method employ a substrate which is movable in opposite directions and such movable substrate enables a supply web of material to be laminated to define any desired number of layers by urging a first layer-defining length of the web into adhering contact against the substrate while moving the substrate in one direction with associated moving means followed by bifolding the web to start a second layer-defining length and urging the second length of the web into adhering contact against the first length to define the multiple layer sheet while moving the substrate in a direction opposite from said one direction with the moving means.

Other details, uses, and advantages of this invention will be readily apparent from the embodiments thereof presented in the following specification, claims, and drawing.

BRIEF DESCRIPTION OF THE DRAWING

The accompanying drawing shows present preferred embodiments of this invention, in which FIG. 1 is an end elevational view with certain parts shown schematically and other parts broken away illustrating one exemplary embodiment of the improved apparatus and method of this invention;

FIG. 2 is a view of the right-hand portion of the apparatus of FIG. 1 illustrating a first layer-defining length of a web of material which is to be laminated being urged into adhering contact against a movable substrate;

FIG. 2A is a fragmentary view illustrating the forward end portion of the first length of the web as it is first brought into contact with the movable substrate;

FIG. 3 is a view similar to FIG. 2 illustrating a second length of the web of material which is to be laminated being urged into adhering contact against the first length of the web of material;

FIG. 3A is a fragmentary view similar to FIG. 2A and illustrating the manner in which the web of material is bifolded to start the second layer-defining length which is being laminated in FIG. 3; and FIG. 4 is a view similar to FIG. 1 illustrating the multiple layer sheet defined by the first and second lengths of the web being stripped from the substrate.

DESCRIPTION OF ILLUSTRATED EMBODIMENT

Reference is now made to FIG. 1 of the drawing which illustrates one exemplary embodiment of an overall apparatus or machine which is designated generally by the reference numeral 10 and the machine 10 is comprised of a pair of apparatus 11 of this invention which are substantially identical in construction and operation. Each apparatus 11 is particularly adapted for making a multiple layer sheet in a continuous and simple manner and each apparatus 11 may be employed to carry out the method of this invention. Further, for simplicity and ease of presentation the detailed description will proceed referring only to the right-hand apparatus 11 with the understanding that the construction and operation of the left-hand apparatus 11 (except for directions of rotation) is substantially identical thereto whereby corresponding parts of the left-hand and right-hand apparatus will be given the same reference numerals. The utilization of two substantially identical apparatus 11 enables the right-hand apparatus, for example, to be performing a laminating function as illustrated at 12 in FIG. 1 while simultaneously the previously laminated multiple layer sheet is being removed from the left-hand apparatus as illustrated at 13.

The apparatus 10 comprises a support structure 14 which suitably rotatably supports a pair of rotatable rollers shown as a first roller 15 and a second roller 16. The rollers 15 and 16 have suitable drive and synchronizing means 17 for rotating each in either direction and at the desired speed and such drive and synchronizing means may be any suitable means known in the art and include drive connections 18 to the roller 15 and 16.

The apparatus 11 includes a substrate which in this example is in the form of a coilable or windable substrate web or sheet S and the rollers 15 and 16 serve as means for moving the substrate S in opposite directions with such movement being provided by selecting the direction of rotation of rollers 15 and 16 as desired.

The apparatus 11 has web supplying means designated generally by the reference numeral 20 for supplying a web of material which is to be laminated to define a laminated construction or multiple layer sheet and such multiple layer sheet is designated generally by the reference numeral 21 in FIG. 4. The web supplying means 20 comprises a rotatable web supporting shaft 22 which supports a supply roll 23 of a web W of material which is to be laminated. The web supplying means 20 also comprises a dancer roll 24 of known construction which controls the tension in the web W and a horizontal belt conveyor 25 comprised of a comparatively wide endless flat belt 26 rotatably supported at its opposite ends by belt conveyor rollers 27 with one of the rollers being driven by a suitable drive.

The web W which is to be laminated to define multiple layer sheet 21 may be any suitable material and preferably an elastomeric material such as a natural rubber, a synthetic rubber, or any suitable plastic material; and, the apparatus and method of this invention will be presented herein in connection with the laminating of a web W of uncured rubber where such apparatus and method have been used to provide outstanding results.

The apparatus 11 has a device in the form of a diverter plate 30 which is particularly adapted to divert the web W into operative association with urging means designated generally by the reference numeral 31 and used to urge certain lengths of the web W into adhering contact with either the substrate web S or a previously laminated length of the web W and in a manner to be described in detail subsequently.

The apparatus 11 also has stripping means comprised of a stripping roller 32 and a cooperating belt conveyor 33 which are particularly adapted to receive a stripped end portion 34, see FIGS. 1 and 4, of the multiple layer sheet 21 therebetween. The rollers 32 and conveyor 33 are movable or rotatable in a cooperating manner while compressing end portion 34 therebetween to provide continuous stripping of the multiple layer 21 sheet from the substrate S. The conveyor 33 is comprised of an endless comparatively wide conveyor belt 28 supported at its opposite ends in the usual manner by conveyor rollers 35 and with at least one of such rollers being a belt-driving roller.

The urging means 31 is comprised of first and second urging means designated respectively by the reference numerals 36 and 37 and the urging means 36 and 37 of this example are defined by a plurality of three nip rolls 40, 41, and 42 with the central nip roll 41 being common to the other two nip rolls 40 and 42. Thus, it is seen that the urging means 36 is defined by cooperating nip rolls 40 and 41 while the urging means 37 is defined by cooperating nip rolls 41 and 42. The nip rolls 40, 41, and 42 may be driven, if desired, by suitable drive means suitably synchronized with the drive and synchronizing means for the rollers 15 and 16.

The web W of this example is laminated to define a multiple layer sheet comprised of two layers; however, it will be appreciated that any desired number of layers may be defined in a continuous manner without cutting the web W between layers utilizing the apparatus and method of this invention and in a manner which will be apparent hereinafter. In particular, to define the two layer sheet 21 a first web length 44, a portion of which is illustrated in FIG. 2, is brought into adhering contact against the substrate web S by the cooperating action of the nip rolls 40 and 41 and as illustrated at 45 in FIG. 2.

The length 44 of web W is adhered against the substrate by bringing a forward end portion 46 of the length 44 into adhering contact with the substrate S and this is achieved, as shown in FIG. 2A, simply by bringing the forward end portion 46 into engagement with that portion of the substrate S which is held in an outwardly convex configuration by the central common nip roll 41 whereupon both rollers 16 and 15 are rotated counterclockwise to thereby move the substrate S in one direction and compress the web W against the substrate S so that it adheres thereagainst. The web W and the substrate S are such that the first portion of length 44 of the web W will adhere thereagainst once the nip rolls 40 and 41 urge or compress such length against the substrate S.

Once the desired length 44 of the web W has been adhered against the windable substrate web S the direction of rotation of the rollers 16 and 15 is reversed to that such rollers are both rotated in a substantially simultaneous manner in a clockwise direction so that a second length 48 of the web W, a portion of which is shown in FIG. 3 may be urged by the nip rolls 41 and 42 in adhering contact against the previously adhered length 44. The adhering of the second length 48 is achieved with optimum simplicity with the web W remaining intact or uncut and this is achieved ad illustrated in FIG. 3A merely by reversing the direction of rotation of the rollers 16 and 15 whereby a bifolding action or fold is provided in the web W as illustrated at 50 in FIG. 3A. The bifolding action results in the terminal end portion 51 of the first length 44 and the forward end portion 52 of the second length 48 being brought into adhering contact and urged together by the cooperating action of the nip rolls 41 and 42.

To prevent waste of web material the length 48 of the web W is made equal to the length 44 of such web and once the entire length 48 has been laminated into position a cutting device 53 comprised of a cutter 55 and a cooperating back-up member or block 56 is used to sever the web W while simultaneously stopping the moving means 20. The multiple layer sheet 21, comprised in this example of two layers, is stripped from the substrate web S by compressing such sheet between the rotating roller 32 and the conveyor 33 as shown at 57 in FIG. 4 while simultaneously coiling or winding the substrate S on the roller 15.

During the time that the multiple layer sheet 21 is being stripped from the right-hand apparatus 11 as shown in FIG. 4 the left-hand apparatus 11 of FIG. 1 may be employed to define another multiple layer sheet 21 in essentially a similar manner as described above. To operate the left-hand apparatus 11 the diverter device or plate 30 is moved through an angle 58 to the dotted line position illustrated at 60 in FIG. 1 to thus position the web W directly above the central nip roll 41 of such left-hand apparatus.

The web W has been described as being a web of uncured rubber and such rubber web tends to adhere to itself with a reasonably tenacious bond and without requiring further adhesive means so that any desired number of layers or plies may be provided on the multiple layer sheet and this may be achieved merely by reversing the direction of movement of the substrate S and bifolding each later length against a previously adhered length. However, it is desirable that the bond between the first layer 44 and the substrate sheet S be comparatively poor to enable subsequent easy stripping of the multiple layer sheet whereby the material used to make the substrate S is selected accordingly.

In particular, when laminating the web W of uncured rubber the substrate web S is made of a comparatively non-stick material, such as nylon or polypropylene. The substrate web S of nylon or polypropylene may be a sheet or ribbon of uniform thickness or where it is desired to provide a substrate S having greater strength such substrate web S may be made of woven nylon, woven polypropylene, or the like. It will also be appreciated that non-woven materials comprised of bonded high strength longitudinal strands may be used to define the substrate S. However, regardless of the material used to make the substrate S it will be appreciated that such substrate is preferably a coilable or windable material which is moved by winding and unwinding action between rotatable rollers such as 15 and 16.

In applications of this invention where other materials other than rubber are being laminated the material selected to make the associated substrate S is preferably such that a comparatively weak adhesive bond is provided between the first layer of the web being laminated and the substrate S while a more tenacious or stronger adhesive bond or adhesion is provided between adjoining layers of the web W itself being laminated.

From the above description it is therefore clear that the apparatus and method of this invention enable the continuous forming of a multiple layer sheet which may have two or any desired number of layers.

Having described the construction and operation of the apparatus and method of this invention in considerable detail a brief presentation will now be made to highlight the simplicity with which a multiple layer sheet 21 may be made. In particular, a movable substrate, such as coilable or windable substrate S is provided and a forward end portion of a web W of material which is to be laminated against the substrate S is adhered against the movable substrate as illustrated in FIG. 2A. The substrate S is then moved in one direction as illustrated in FIG. 2 by rotating the rollers 16 and 15 counterclockwise while bringing the length 44 into adhering contact against the substrate S by the action of urging means 36 comprised of cooperating nip rolls 40 and 41. The substrate S is then moved in a direction opposite from the first direction as shown in FIG. 3 by rotating the rollers 16 and 15 in a clockwise direction while bringing the second length 48 of the web W into adhering contact against the first length 44 by the action of the urging means 37 defined by cooperating nip rolls 41 and 42. The lengths 48 and 44 of the web W are made substantially equal whereupon the supply web W is cut free utilizing the cutting device 53. The multiple layer sheet 21 thus defined is then stripped from the substrate web S which may be reused many times. The sheet 21 may then be processed as required, depending upon the end product being made utilizing such multiple layer sheet.

In this disclosure of the invention the drives and associated controls for the various rollers including certain conveyor rollers, the nip rolls, etc., have not been illustrated. However, it will be appreciated that any suitable drive and control means known in the art may be employed.

It will also be appreciated that the drive and synchronizing means 17 for the rollers 15 and 16 may include suitable braking devices, speed control devices, etc. to assure that the proper tension is maintained between the roller 16 and the nip roll 42 and the roller 15 and the nip roll 41, for example, so that winding and unwinding may be achieved in a precision manner as required due to the increasing diameter of the material being wound on one roller and the correspondingly decreasing diameter of the material being unwound from the other roller and vice versa.

While present exemplary embodiments of this invention, and method of practicing the same, have been illustrated and described, it will be recognized that this invention may be otherwise variously embodied and practiced within the scope of the following claims.

What is claimed is:

1. An apparatus for making a multiple layer sheet comprising, a substrate consisting of a windable substrate sheet, means for moving said substrate in opposite directions comprising a pair of rotatable rollers each supporting an associated end portion of said substrate sheet, means for supplying a web of material which is to be laminated to define said multiple layer sheet, first means urging a first length of said web into adhering contact against said substrate while moving said substrate in one direction with said moving means, second means urging a second length of said web into adhering contact against said first length to define said multiple layer sheet while moving said substrate in a direction opposite from said one direction with said moving means, and means for stripping said multiple layer sheet from said substrate.

2. An apparatus as set forth in claim 1 in which said means for supplying said web of material comprises a supply roll of said web of material in the form of an elastomeric material which is supported for unwinding rotation and said apparatus further comprising a cutting device for cutting said web once said first and second lengths have been unwound from said supply roll.

3. An apparatus as set forth in claim 1 in which said first and second urging means are defined by a plurality of three nip rolls wherein one nip roll is common to the other two, one cooperating pair of nip rolls being defined by one of the other two nip rolls cooperating with the common roll to define said first urging means and the other cooperating pair of nip rolls being defined by the second of the other two nip rolls cooperating with the common roll to define said second urging means.

4. An apparatus as set forth in claim 3 and further comprising a diverter plate for diverting and directing said web of material against the top central portion of the common nip roll.

5. An apparatus as set forth in claim 4 in which said means for supplying a web of material comprises a dancer roll for controlling the amount of tension in said web.

6. A method of making a multiple layer sheet comprising the steps of, providing a movable substrate consisting of a windable substrate sheet, adhering one end portion of a web of material which is to be laminated against said substrate, moving said substrate in one direction while bringing a first length of said web into adhering contact thereagainst by compressing said first length of an associated length of substrate between a first cooperating pair of nip rolls, moving said windable substrate in a direction opposite from said one direction while bringing a second length of said web which is substantially equal to said first length into adhering contact against said first length by compressing said second length, said first length, and said associated length of windable substrate between a second cooperating pair of nip rolls, in which one of said second pair of nip rolls is common to both first and second pair of nip rolls, to complete said multiple layer sheet, cutting said web free of said adhered second length and hence free of said multiple layer sheet and stripping said multiple layer sheet from said substrate.

7. A method as set forth in claim 6 in which said step of providing a movable substrate comprises providing said movable substrate as a windable substrate sheet; and comprising the further steps of supporting one end portion of said windable substrate sheet on a first of a pair of cooperating rollers; and supporting the opposite end portion of said substrate sheet on a second of said cooperating pair of rollers; during said adhering of said first length of said web into position on an associated length of said substrate sheet said first length and an associated length of said substrate sheet are wound on said first roller while said substrate sheet is being unwound from said second roller, and during said adhering of said second length of said web into position on said first length said associated length of said substrate sheet, said first length, and said second length are wound on said second roller while said associated length of said substrate sheet and first length are being unwound from said first roller.

8. A method as set forth in claim 7 and comprising the further step of stripping the multiple layer sheet from said substrate.

9. A method as set forth in claim 8 in which said stripping step comprises stripping said multiple layer sheet from said substrate sheet while simultaneously winding the substrate sheet on said first roller.

10. A method as set forth in claim 9 in which said stripping step comprises stripping said multiple layer sheet by passing it between a roller and a cooperating belt conveyor.

11. A method as set forth in claim 10 in which said web of material which is to be laminated is a web of an elastomeric material which tends to adhere to itself, said substrate is made of a material which has comparatively poor adhesion of said web of elastomeric material, and said adhering contact is achieved by compressing each of said lengths in a sandwiched manner toward said substrate.

* * * * *